June 12, 1962 R. A. GULICK 3,038,494
SWING CHECK VALVE
Filed Feb. 19, 1960 2 Sheets-Sheet 1

Ronald A. Gulick
INVENTOR.

BY Russell E. Schloff
ATTORNEY

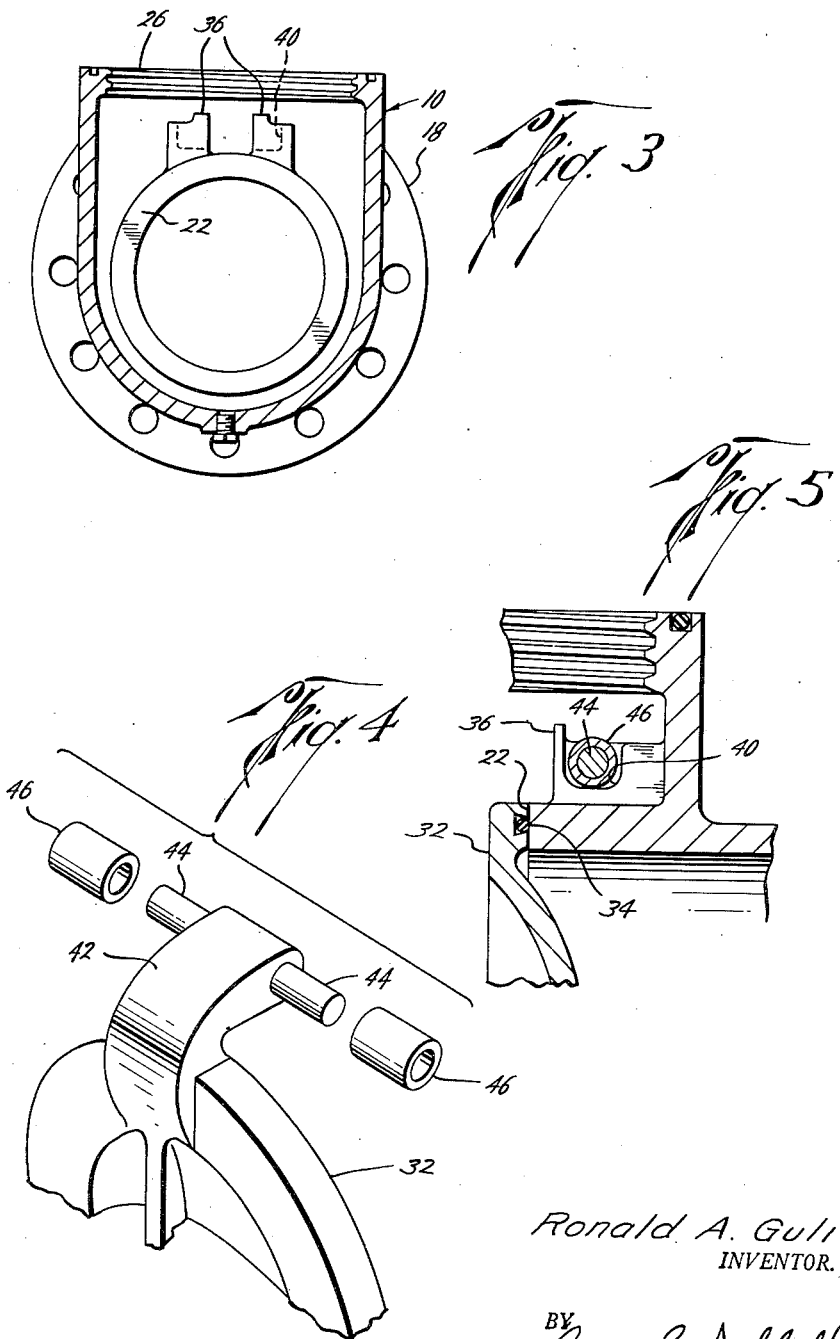

United States Patent Office 3,038,494
Patented June 12, 1962

3,038,494
SWING CHECK VALVE
Ronald A. Gulick, Houston, Tex., assignor to ACF Industries, Incorporated, New York, N.Y., a corporation of New Jersey
Filed Feb. 19, 1960, Ser. No. 9,967
3 Claims. (Cl. 137—527.2)

This invention relates to a swing check valve and particularly to means for attaching and retaining the clapper thereof.

Swing check valves have been employed in pipelines for many years to prevent the backflow of fluids when for some reason the force, upstream of the valve, which is moving the fluid through the pipeline, fails or the flow is reversed. The valves are so constructed that, upon failure or reversal of the motive force, they automatically close.

Swing check valves are relatively simple in construction, being comprised of a body having longitudinally aligned flow passages, a seating surface surrounding the upstream passage and a free swinging clapper which forms a seal with the seating surface. The clapper is maintained in the open position by the flow of fluid through the line and upon discontinuance of upstream flow automatically swings to the closed position establishing a seal preventing the lading from the downstream side of the valve flowing past the valve. Problems exist in means for attaching and retaining the clapper in its hanger assembly and the present invention is directed principally to providing a simple and an economical means of attaching and retaining the clapper.

To insure positive closure, swing check valves frequently use a resilient seal member between the clapper and seating surface. In order to maintain the gap necessarily bridged by the such resilient sealing member at a minimum, the present invention provides a relationship between the clapper assembly and pocket whereby in the closed position there is no restraint on the clapper assembly in a direction normal to the seating surface except that imposed by the seating surface itself. Such construction also automatically compensates for normal planar wear of the clapper and seating surface.

Pipelines must be capable of handling various internal objects of a size coincident with the inner diameter of the pipe, such as "pigs," scrappers, balls, etc. These objects are for the purpose of cleaning and gaging the inner periphery of the pipe and for separating the interfaces of a multiplicity of ladings. Accordingly, it is essential that the swing check valve be a full opening valve and that the clapper be completely moved away from the flow passage in the open position to provide an uninterrupted path for the various objects passing through the valve. Due to the above requirements for scraping, gaging and separating, swing check valves are normally full port area valves; therefore, the clapper has to be larger than the internal diameter of the pipeline to which the valve is connected. Such construction has often resulted in a large bulky bonnet closure and in the case of low pressure flanged end valves has necessitated studding a portion of the flanges near the bonnet prohibiting easy disassembly from the line. The present construction provides a streamlined body which will not restrict the movement of an object passing through the valve and which is designed to be of a minimum size. Moreover, the means of attaching and retaining the clapper is such that the bonnet required by the clapper retaining means is maintained at a minimum and the overall height and length of the valve markedly reduced.

It is the principal object of the present invention to provide a swing check valve having the means for attaching and retaining the free swinging clapper so constructed that the clapper in the closed position is unrestrained in a direction normal to the seating surface except by the seating surface.

It is another object to provide a means for retaining the clapper whereby the bonnet diameter and overall height and length of the body is maintained at a minimum.

It is a further object to provide a swing check valve having a body so constructed that it will offer no interference to the various objects passing through the pipe line It is still a further object to provide a swing check valve which is economical to construct and efficient in operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 3 is a sectional view of the body taken generally through the valve chamber.

FIG. 4 is an exploded view showing the clapper and bearing detail.

FIG. 5 is an enlarged view showing the hanger assembly for the clapper taken generally along lines 5—5 in FIG. 1.

Figure 1:
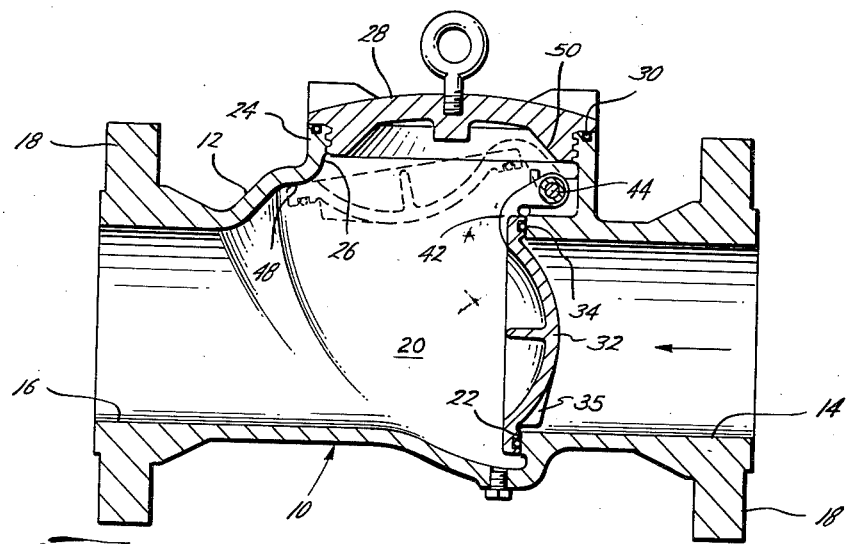
FIG. 1 is an elevational view in section of a swing check valve embodying the present invention, the clapper is shown in the closed position in full lines and the open position by dotted lines.

Referring now to the drawings, the valve 10 is comprised of a body 12 having longitudinally aligned flow passages 14 and 16. The outer ends of the passages are provided with flanges 18—18 for connecting the valve to a flow line. As is well known in the art, the ends of the flow passages may be formed with weld ends, male or female threads, or other special type end connections for connecting the valve to the flow line. For purposes of uniformity throughout, reference to passage 14 will mean the upstream or inlet side, and reference to passage 16 will mean the downstream or outlet side.

Interposed between the two passages 14 and 16 there is a valve chamber 20. The valve chamber end of the upstream passage 14 is provided with a machined seating surface 22 which surrounds the passage 14. Except for the valve chamber 20, which is in the form of a torus, the internal configuration of the body is generally cylindrical. Such construction provides for a minimum internal area thereby providing a light economical casting. Moreover, the intersection of cylindrical section with the torus portion is smooth and does not offer any resistance to the smooth passage of any object passing through the valve. Entrance into the valve chamber 20 is gained through an upstanding cylindrical hub 24 which is provided with an opening 26. The internal wall of the hub 24 is provided with threads for receiving a threaded bonnet member 28 of substantially circular configuration. An O-ring sealing member 30 positioned in an annular groove in the outer surface of the cylindrical hub 24 cooperates with the face portion of the bonnet 28 to provide a bonnet seal for the valve.

As previously mentioned, the valve chamber end of the upstream passage 14 is provided with a seat 22 which provides a sealing surface for a circular substantially disc-shaped clapper member 32. Clapper member 32 is provided with an annular dovetail groove for receiving a resilient sealing member 34 to insure a positive seal between the clapper 32 and the seating surface 22 in the closed position of the valve 10. To insure positive closure and eliminate any extrusion of the resilient sealing member 34 regardless of pressure, the clapper 32 is completely unrestrained in a direction normal to the plane of the seat 22 except as restrained by the seat itself. The clapper member 32 is swingingly supported above the seat 22. To form such support, there is positioned above the seat 22 a pair of integrally cast opposed flange members 36—36 which extend from the internal wall of the hub 24 to form pockets 40—40, see FIGS. 2 and 3.

Figure 2:
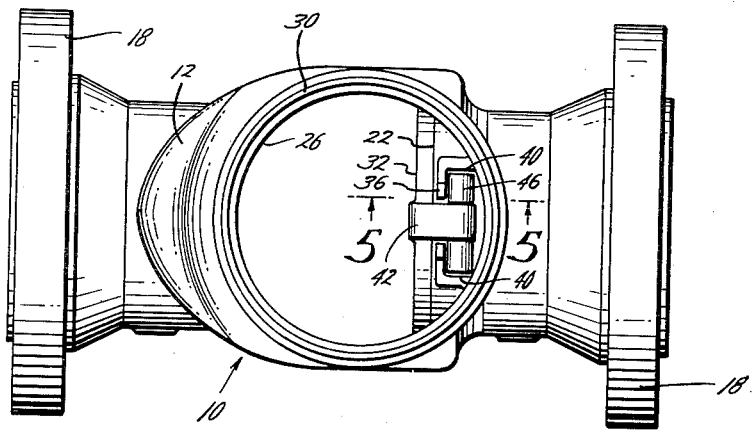
FIG. 2 is a top view of the valve shown in FIG. 1 with the bonnet removed.

The pockets 40—40 are positioned and proportioned so that in the closed position clapper 32 is supported in a plane parallel to the seat 22 insuring contact of the resilient sealing member 34 with seat 22 yet allowing the clapper 32 to be unrestrained in a direction normal to seat 22 except by the seat itself, see FIGS. 2 and 5. To provide for such attachment, the clapper member 32 is provided with an angularly extending hanger shank member 42 having a pin member 44 which extends perpendicularly therethrough and parallel with the face of the clapper 32. The ends of pin member 44 may be provided with sleeve bearings 46—46, see FIG. 4. By using separate sleeve bearings 46—46, the valve may be trimmed with the proper materials to prohibit wear or corrosive action resulting from the lading flowing through the valve.

The assembled clapper member is dropped into the pockets 40—40. Being so positioned, the clapper member hangs freely by its own weight against the seat 22. As previously mentioned, the pockets 40—40 and clapper assembly are so proportioned that only general restraint is exercised to insure seal contact while still allowing the clapper 32 to float against the seat 22 by pressure eliminating any extrusion gap, see FIG. 1. Any flow through the valve emanating from the upstream side 14 will cause the clapper member 32 to swing up until it strikes a stop 48 located in the upper part of the valve chamber 20. The stop 48 is so located that the clapper member 32 will be completely out of the way thereby affording a clear passage for any object passing through the pipeline. As can be seen in FIG. 1, the clapper 32 is bellied in the direction of the resilient sealing member 34 so that as a scrapper passes through the valve the resilient sealing member 34 is lifted up and removed from the path of the scrapper knives preventing damage to the resilient sealing member 34. Additionally, the clapper 32 is provided with a protecting rib 35 on its bellied side, which in the open position is aligned with the flow passages, to further aid in protecting the resilient seal 34 by maintaining the clapper 32 out of the path of a scrapper. The rib 35 continues to the inner edge of the annular flange portion in which the resilient sealing member 34 is located. Therefore, in the open position the resilient sealing member 34 is spaced from the plane of the rib 35 and accordingly protected from the cutting action of scrapper knives. On interruption of upstream flow or reversal of flow, the clapper member 32, by its own weight, will drop toward the seat 22. As soon as the clapper member 32 reaches the intersection between the cylindrical portion and torus portion of the body, any further material amount of flow from the upstream passage 14 is stopped and the clapper member 32 will swing into sealing engagement with the seat 22 preventing the backward flow of any fluid coming from the downstream side 16 of the valve. The previously mentioned clapper assembly and pocket relationship allows the final movement of the clapper, which actually compresses the resilient seal member 34 to the seat 22, to be perpendicular to the seat. Such construction automatically compensates for normal planar wear of the clapper and seat thereby maintaining at an absolute minimum the gap necessarily bridged by the resilient seal 34.

In the event that the flow from upstream passage 14 is increased slowly, the clapper 32 will swing up an amount proportional to the flow and its own weight will retain the bearings 46—46 within the pockets 40—40. However, there undoubtedly will be occasions where the increase in flow rate will be such that the clapper would be accelerated upwards and out of the pockets 40—40. Also, the passing of a full bore object will cause the clapper 32 to lift out of pockets 40—40 especially when the clapper 32 is approaching a position parallel to the run. Accordingly, it is necessary to provide means to retain the clapper assembly within the pockets 40—40. In the present invention, this is accomplished by an annular protrusion 50 on the inside of the bonnet 28. The inner surface of the protrusion 50 is so shaped that the distance between the upper edge of flanges 36—36 and the protrusion 50 provides a throat which prevents dislodgement and jamming of the clapper regardless of the position of the valve itself or the position of the clapper assembly. Specifically, the angularly extending shank member 42 abuts surface 50 simularly with bushings 46—46 abutting flanges 36—36. With such construction, upon removal of the bonnet 28, the clapper assembly can readily be removed from engagement with the pockets regardless of clapper position. Such construction permits utilization of a generally hemispherical clapper of a small radius extending well into passage 14. Such clapper can be light in weight and provides more protection for the resilient seal member upon scrapper passage. By eliminating pockets for retaining the clapper assembly, the overall length and height of the body is maintained to a minimum. By using such design, it is possible to maintain specified code end-to-end dimensions even on low pressure valves without studding the flanges, which is frequently required with other types of retention means. Such construction does not depend upon the peripheral curvature of the bonnet and accordingly can be used on large sizes which would otherwise require an unrealistic extension of pin 44 to get under the curvature of the bonnet. Also, such construction does not require an oriented bonnet thereby permitting the utilization of a threaded bonnet connection.

As can be seen from the foregoing, the present invention provides a novel check valve having a simple and economical connection for the clapper member which permits full opening of the valve for the passage therethrough of the various objects normally passing through a pipe line, at the same time efficiently retaining the clapper in its hanger assembly. The particular shape of the body is so adapted that there will be no tendency for an object to hang up in its passage through the body, yet the body is so designed as to utilize a minimum internal area accordingly providing a lighter weight valve than is customarily provided. The clapper is so designed that the resilient sealing member will be removed from the path of a scrapper and protected from cutting damage. Upon any failure of upstream flow or reversal of flow, the clapper member will immediately close. Again, the body design is such that as soon as the clapper member reaches the intersection between the torus and the cylindrical portion of the body, there will be no further material flow and the clapper will tightly close against the seat preventing any back flow. The connection for the clapper and its retention by the bonnet is such to provide a free swinging action of the clapper member to insure positive closure and preclude any accidental dislodging of the clapper member during operation thereof. The connection provides no restraint in the closed position in a direction normal to the seat except that of the seat and automatically compensates for normal planar wear of the clapper and seat. The retaining means are so designed as to require the minimum amount of bonnet opening thereby resulting in a minimum valve body. Accordingly, the novel valve is durable and economical in construction and simple and efficient in operation.

As various changes may be made in the form, construction and arrangements of the parts herein without depart-

I claim:

1. A swing check valve comprising a housing having longitudinally aligned flow passages therethrough with a valve chamber interposed therebetween, an opening in the valve chamber, the valve chamber end of one of said passages machined to provide a seating surface for the valve, a clapper member swingingly disposed adjacent the seating surface for seating there against in the closed position of the valve, an angularly extending shank member provided on the clapper member, a pin extending through the shank member, a pair of flange members provided adjacent the seating surface providing pockets for receiving the ends of the pin, said clapper member provided with an annular flange portion having an annular groove in which is positioned a resilient sealing member, the portion of the clapper member inside said flange being generally hemispherical in the direction of the resilient sealing member, a rib extending radially from the apogee of the hemispherical surface to a position closely adjacent to the annular flange portion in a direction whereby in the open position the rib is aligned with the flow passages, a stop in the body for the clapper so positioned that the clapper can swing out of the path of any object passing through the valve, the hemispherical shape and rib removing the resilient sealing member from the path of any object.

2. A swing check valve comprising a housing having longitudinally aligned flow passages therethrough with a valve chamber interposed therebetween, an opening in the valve chamber, a bonnet to close the opening in the valve chamber, the valve chamber end of one of said passages machined to provide a seating surface for the valve, a clapper member swingingly disposed adjacent the seating surface for seating there against in the closed position of the valve, an angularly extending shank member provided on the clapper member, a pin extending through the shank member, a pair of sleeve bearings telescoped over the ends of said pin, a pair of flange members provided adjacent the seating surface providing pockets for receiving the bearings, an angularly extending annular protrusion on the bonnet co-operating with the flange members to provide a throat preventing dislodgement and jamming of the bearings on the ends of the pin, the clapper member provided with an annular flange portion having an annular groove in which is positioned a resilient sealing member, the portion of the clapper member inside said flange being generally hemispherical in the direction of the resilient sealing member, a rib extending radially from the apogee of the hemispherical surface to a position closely adjacent to the annular flange portion in a direction whereby in the open position the rib is aligned with the flow passages, a stop in the body for the clapper so positioned that the clapper can swing out of the path of any object passing through the valve, the hemispherical shape and rib removing the resilient sealing member from the path of any object.

3. A swing check valve comprising a housing having longitudinally aligned flow passages therethrough with a valve chamber interposed therebetween, an opening in the valve chamber, a bonnet to close the opening in the valve chamber, the valve chamber end of one of said passages machined to provide a seating surface for the valve, a clapper member swingingly disposed adjacent the seating surface for seating there against in the closed position of the valve, an angularly extending shank member provided on the clapper member, a pin extending through the shank member, a pair of sleeve bearings telescoped over the ends of said pin, a pair of flange members provided adjacent the seating surface providing pockets for receiving the bearings, the bearings and pockets being so proportioned and positioned that in the closed position the angularly extending shank member of the clapper is free of contact with any restraining member and the bearings have limited movement available along an axis parallel to the axis of the flow passages whereby the clapper is unrestrained in a direction normal to the seating surface except by the seating surface itself, the clapper member provided with an annular flange portion having an annular groove in which is positioned a resilient sealing member, the portion of the clapper member inside said flange being generally hemispherical in the direction of the resilient sealing member, a rib extending radially from the apogee of the hemispherical surface to a position closely adjacent to the annular flange portion in a direction whereby in the open position the rib is aligned with the flow passages, a stop in the body for the clapper so positioned that the clapper can swing out of the path of any object passing through the valve, the hemispherical shape and rib removing the resilient sealing member from the path of any object.

References Cited in the file of this patent
UNITED STATES PATENTS

| | | |
|---|---|---|
| 318,649 | Patrick | May 26, 1885 |
| 846,317 | Kiddle | Mar. 5, 1907 |
| 2,918,934 | Wheatley | Dec. 29, 1959 |